US005710748A

United States Patent [19]
Hofer

[11] Patent Number: 5,710,748
[45] Date of Patent: Jan. 20, 1998

[54] OFF TRACK DETECTION SYSTEM AND METHOD FOR RUGGEDIZED OPTICAL DISK DRIVE

[75] Inventor: Gregory V. Hofer, Boise, Id.

[73] Assignee: Hewlett-Packard Company, Palo, Calif.

[21] Appl. No.: 504,004

[22] Filed: Jul. 19, 1995

Related U.S. Application Data

[62] Division of Ser. No. 222,972, Apr. 5, 1994.

[51] Int. Cl.[6] .................................................... G11B 7/095
[52] U.S. Cl. ............................... 369/44.35; 369/44.29
[58] Field of Search ......................... 369/44.35, 44.36, 369/44.29, 44.34, 44.25, 44.26, 54, 44.32

[56] References Cited

U.S. PATENT DOCUMENTS

| | | | |
|---|---|---|---|
| 4,700,056 | 10/1987 | Silvy et al. | 250/201 |
| 4,937,440 | 6/1990 | Hofer et al. | 250/201.5 |
| 4,942,564 | 7/1990 | Hofer et al. | 369/38 |
| 5,048,002 | 9/1991 | Horie et al. | 369/44.35 |
| 5,109,367 | 4/1992 | Yoshikawa | 369/44.32 |
| 5,113,384 | 5/1992 | McDonald et al. | 369/44.29 |
| 5,199,011 | 3/1993 | McDonald et al. | 369/38 |
| 5,251,194 | 10/1993 | Yoshimoto et al. | 369/44.29 |

Primary Examiner—Thang V. Tran

[57] ABSTRACT

An optical disk drive system having a means for detecting off-track conditions with high reliability under conditions causing the objective lens to deviate from optimal focus, such as in the presence of external mechanical shocks. As the lens travels out of focus, the ability to resolve features decreases due to the lose of image contrast, causing a loss of tracking error signal (TES) gain. A digital signal processor (DSP) compensates for this loss by continuously determining an adjustable TES threshold representing the same desired percentage off track and same percentage of TES amplitude. A straight line approximation of this ideal adjustable threshold is used as a threshold to determine if the beam is within the desired amount off track. Alternatively, the DSP amplifies the TES by an amplification function to maintain the TES at a constant value while the objective lens travels out of focus. The TES amplification function is a straight line approximation of an ideal amplification function. The amplified TES is then compared against a fixed TES threshold to determine if the beam is within the desired amount off track. The DSP compensates for head optics astigmatism by shifting the adjustable TES threshold and adjustable TES amplification to a corrected position corresponding to the optimum TES. Dual adjustable and fixed TES thresholds are utilized to filter noise glitches on smaller off track conditions and simultaneously provide fast detection of large off track excursions.

7 Claims, 10 Drawing Sheets

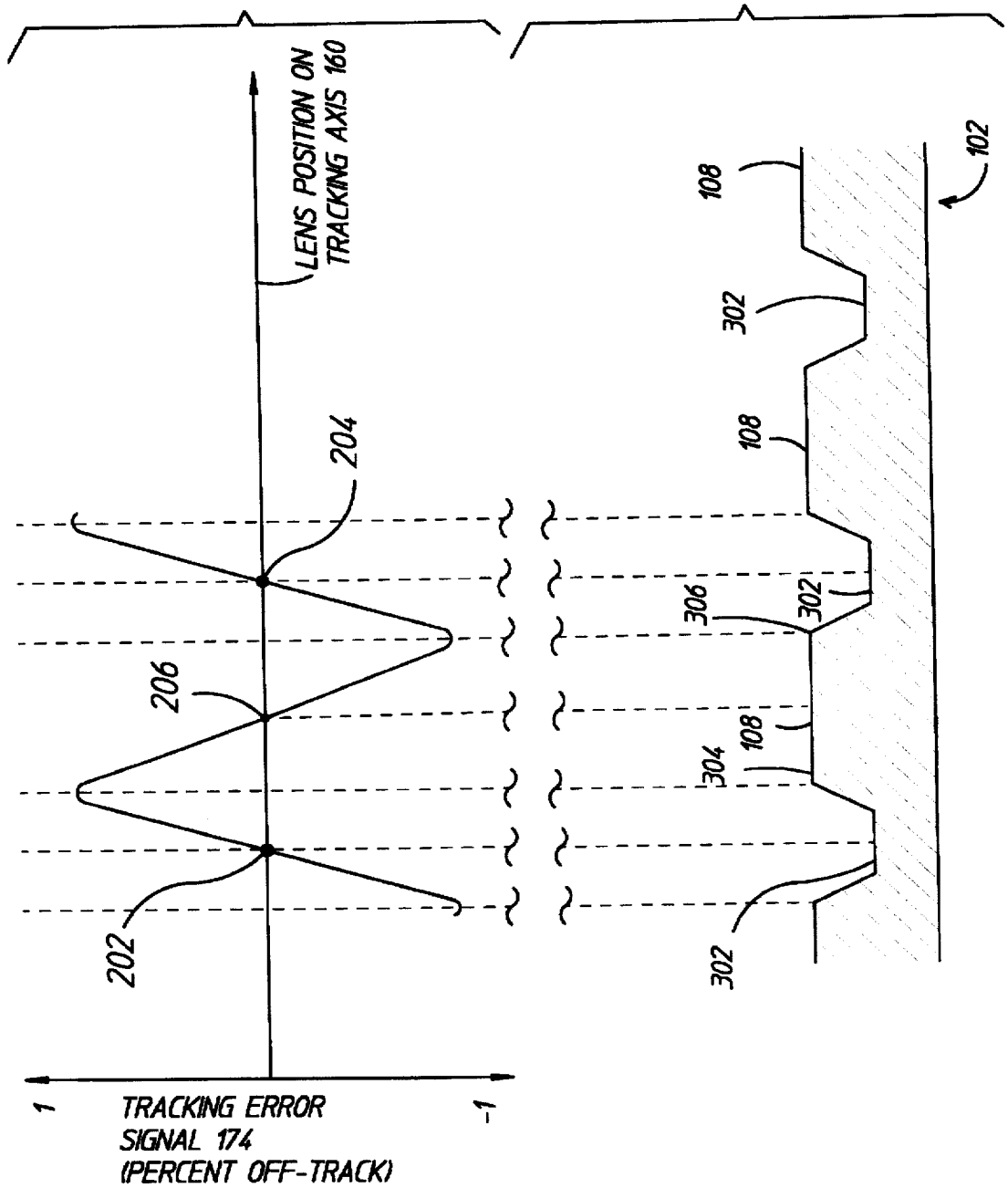

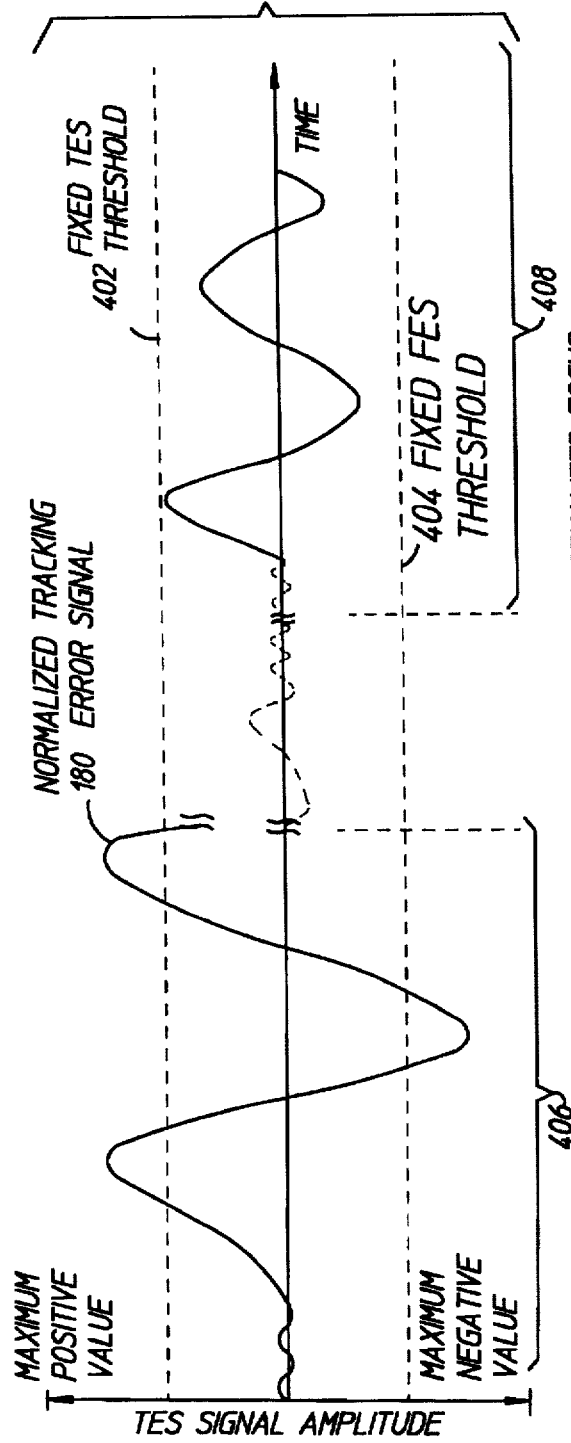
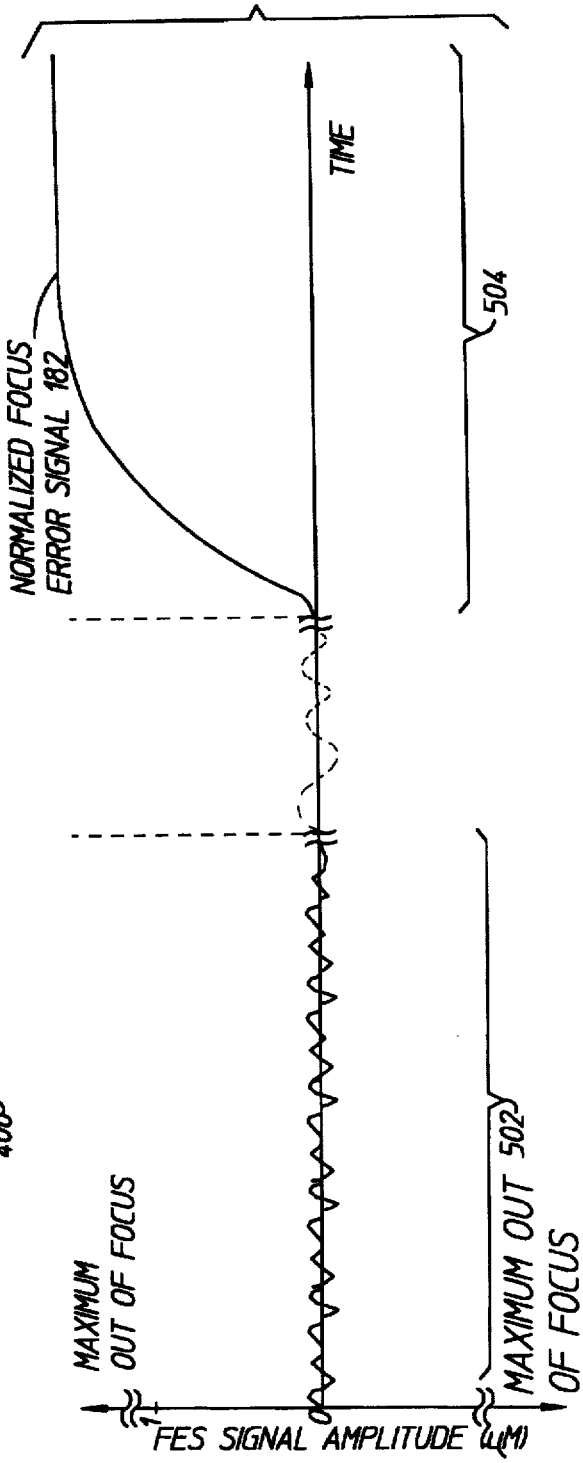

OFF TRACK DETECTION SYSTEM AND METHOD FOR RUGGEDIZED OPTICAL DISK DRIVE

This is a divisional of copending application Ser. No. 08/222,972, filed on Apr. 5, 1994.

BACKGROUND OF THE INVENTION

1. Field of the Invention

The present invention relates generally to optical data recording, and more particularly, to the detection of off track conditions in optical disk drive systems.

2. Related Art

Optical data recording technology has developed to the point where it is commonly found in many consumer electronic products. Optical video disks and optical compact audio disks have, for example, become very popular. This technology is also being adapted to high density optical data recording and storage systems. With continued advances in this technology it is believed that optical systems of this type will be able to compete in terms of performance and cost with the magnetic data storage systems currently in widespread use.

Optical data recording technology combines the erasability features of magnetic data storage systems with the high data storage capacity of optical systems. For example, a 5.25 inch magneto-optic disk can hold 650 M or 1300 M bytes of information, 1000 or more times the amount of information that a similarly sized magnetic floppy diskette can store. Optical disks are also transportable; they can be easily transferred between optical disk drives. Since the reading, writing, and erasing operations are performed with light beams rather than magnetic heads, optical disks have a long life, high reliability, and are relatively immune to physical wear.

The principles of optical dam recording technology are well known to a person skilled in the relevant art. Information is digitally stored at bit positions on an optical disk. The orientation of the magnetic field at each bit position can be switched between a digital one state in which its north pole is oriented upward, and a digital zero state in which the magnetic field is reversed and the north pole oriented downward. The orientation of the magnetic field at each bit position is set to a particular value (or digital state) by subjecting the bit position to a magnetic field of the appropriate polarity, and heating the bit position of the disk. The magnetic orientation of the bit position is "frozen" when the disk cools and returns to room temperature.

The magnetic fields of all bit positions in an unwritten disk are generally oriented with north poles pointing down to represent digital zeros. When writing information, the bit positions are subjected to a write magnetic bias field and heated by a high intensity laser beam. This causes the orientation of the magnetic fields at the written bit positions to reverse to north poles up. Bit positions are erased by subjecting them to an erase bias field of the opposite polarity, and again heating the bit position. The magnetic field orientation at the erased bit positions is reversed to north poles down.

Data is read from the optical disk using a low-power or read intensity laser beam. Because of the well known magneto-optic phenomenon known as the Kerr Effect, the polarization of a laser beam impinged upon the bit positions will be rotated as a function of the magnetic orientation of the bits. The polarization of the reflected laser beam from bit positions on the optical disk is detected by opto-electronic detector circuitry. Signals from the detector circuitry are then processed to determine whether the bit position is representative of a digital one or zero.

Bit positions are aligned adjacent to each other in an elongated servo track on the optical disk. The optical disk can include a single servo track which is spirally positioned on the disk, or a plurality of concentrically positioned servo tracks. The laser beam used to read, write, and erase data at the bit positions is focused onto the disk by a well known objective lens. Optical disk drives of this type typically include a focus servo system for driving the objective lens about a focus axis to keep the laser beam properly focused on the disk. A tracking servo system is used to drive the objective lens along a tracking axis perpendicular to the servo tracks, and to maintain the laser beam centered over a desired servo track.

After the laser beam has been modulated by the magnetic orientation of the individual bit position and reflected from the optical disk onto the optical detectors, circuitry coupled to the optical detector produces both tracking and focus error signals. The focus error signal (FES) generally has a magnitude and polarity which represent the distance and direction, respectively, from which the objective lens is displaced from proper focus. The tracking error signal (TES) is generally a sinusoidal signal having a magnitude and polarity representative of the distance and direction by which the laser beam is offset from the center of a desired servo track.

The focus and tracking error signals are processed by the servo systems to generate focus and tracking drive signals. The focus and tracking drive signals are applied to respective actuators or motors which cause the objective lens to be driven to a position which minimizes the focus and tracking errors. As the objective lens deviates from the center of the track, the tracking error signal increases in amplitude. In conventional optical disk drive systems, when the tracking error signal amplitude exceeds a predetermined fixed threshold level, the objective lens is considered to be sufficiently "off track" to stop all write and erase operations to avoid operating on an incorrect dam track.

The focus error signal and the tracking error signal are related. Specifically, the amplitude of the tracking error signal is dependent upon the focus of the objective lens as represented by the focus error signal. As the objective lens becomes out of focus and the focus error signal increases, the amplitude of the tracking error signal decreases. This is because the contrast and thus ability to resolve features decreases as the objective lens travels out of focus. This loss of contrast causes a loss of TES amplitude. Thus, the tracking error signal is most reliable when the objective lens is accurately focused. Similarly, the tracking error signal is not reliable when the objective lens is not accurately focused. Thus, when the objective lens is not accurately focused, the tracking error may not properly indicate "off track" conditions.

Recently, optical disk drives are being used in environments which expose them to external shocks and other physically disruptive conditions. The shock levels specified for such ruggedized optical disk drive systems requires the drive to maintain accurate read, write, and erase operations, (that is, experience no data loss) under 10 G, 11 millisecond external shocks. Such external forces cause the objective lens to go partially out of focus. The same external force may cause the objective lens to go off-track. However, as discussed above, the occurrence of an off track condition while the objective lens is not optimally focused results in a reduced tracking error signal amplitude. This tracking error signal may not be accurately interpreted to indicate an off track condition in conventional disk drive systems utilizing fixed threshold detection methods. As a result, conventional optical disk drives may unknowingly erase or write data in a neighboring track when exposed to such external conditions.

What is needed, therefore, is a means for detecting off-track conditions with high reliability under conditions causing the objective lens to deviate from optimal focus, such as in the presence of external mechanical shocks.

SUMMARY OF THE INVENTION

The present invention is an optical disk drive system having a means for detecting off-track conditions with high reliability under conditions causing the objective lens to deviate from optimal focus, such as in the presence of external mechanical shocks.

In the optical disk drive of the present invention, digital information is written and erased at individual bit positions on an optical disk using a laser beam generated by a laser source and focused on the optical disk by an objective lens utilizing magneto-optic principles. When reading data, the polarization angle of the beam is modulated as a function of the magnetic orientation of the bit positions and reflected from the disk onto detectors. The optical disk drive includes closed loop tracking and focus servo systems for accurately positioning the objective lens with respect to the optical disk. The tracking servo system drives and positions the objective lens about a tracking axis so as to center the laser beam on a desired servo track while the focus servo system drives and positions the objective lens about a focus axis so as to properly focus laser beam onto optical disk.

The detector generates detector signals which are used to produce a sinusoidal tracking error signal (TES), a focus error signal (FES), and a servo sum signal. The TES has a polarity and magnitude representative of the direction and distance, respectively, that the beam is displaced from the center of a desired servo track. The FES has a polarity and magnitude representative of the direction and distance, respectively, that the lens is displaced from its proper focus position. The servo sum signal is a measure of the overall intensity of the beam on the detector. The TES and FES signals are normalized to compensate for variations in media reflectivity and are transmitted to a digital signal processor (DSP) to generate digital tracking and focus control signals for controlling tracking and focus motors.

As the lens travels out of focus, the ability to resolve features decreases due to the lose of image contrast. This causes a loss of TES gain. In one embodiment, the present invention compensates for this loss by continuously determining an adjustable TES threshold representing the same desired percentage off track and same percentage of TES amplitude. A straight line approximation of this ideal adjustable threshold is used as a threshold to determine if the beam is within the desired amount off track.

In another embodiment, the DSP amplifies the TES by a TES amplification function to maintain the TES at a constant value while the focus offset values increase. The TES amplification function is a straight line approximation of an ideal amplification function. The TES is then compared against a fixed TES threshold.

Due to a head optics astigmatism, the optimum focal point for generating a maximum TES is not always the same as the optimum focal point for generating a maximum read signal at which the drive may be operating. To compensate for the difference between optimal focus positions, the DSP determines a corrected adjustable TES threshold or a corrected adjustable TES amplification by shifting them to a corrected position corresponding to the optimum TES.

The present invention utilizes dual adjustable and fixed TES thresholds to filter noise glitches on smaller off track conditions and simultaneously provide fast detection of large off track excursions.

The present invention overcomes the limitations of conventional optical disk drive systems which utilize a fixed threshold against which to compare the TES to determine if the focused laser beam has traveled off track. The reduced amplitude of the TES occurring as a result of a loss of focus is accurately interpreted to indicate if an off track condition has occurred, thereby preventing the optical disk drives from inadvertently reading, writing, or erasing data on an incorrect track.

Further features and advantages of the present invention, as well as the structure and operation of various embodiments of the present invention, are described in detail below with reference to the accompanying drawings.

BRIEF DESCRIPTION OF THE FIGURES

The invention is best understood by reference to the Figures wherein references with like reference numbers indicate identical or functionally similar elements. In addition, the left-most digits refers to the figure in which the reference first appears in the accompanying drawings in which:

FIG. 2 is a graph of a tracking error signal;

FIG. 3 is a side cut-away view of a portion of the disk media showing contours;

FIG. 4 is a graph of the tracking error signal corresponding to different positions of objective lens 112 on focus axis 162;

FIG. 5 is a graph of a focus error signal corresponding to different positions of objective lens 112 on focus axis 162;

DETAILED DESCRIPTION OF THE PREFERRED EMBODIMENTS

I. Introduction

The present invention is an optical disk drive system having a means for detecting off-track conditions with high reliability under conditions causing the objective lens to deviate from optimal focus, such as in the presence of external mechanical shocks. As the lens travels out of focus, the ability to resolve features decreases due to the lose of image contrast. This causes a loss of TES gain. In one embodiment, the present invention compensates for this loss by continuously determining an adjustable TES threshold representing the same desired percentage off track and same percentage of TES amplitude. A straight line approximation of this ideal adjustable threshold is used as a threshold to determine if the beam is within the desired amount off track. In another embodiment, the DSP amplifies the TES by a TES amplification function to maintain the TES at a constant value while the focus offset values increase. The TES amplification function is a straight line approximation of an ideal amplification function. The TES is then compared against a fixed TES threshold.

Due to a head optics astigmatism, the optimum focal point for generating a maximum TES is not always the same as the optimum focal point for generating a maximum read signal at which the drive may be operating. To compensate for the difference between optimal focus positions, the DSP determines a corrected adjustable TES threshold or a corrected adjustable TES amplification by shifting them to a corrected position corresponding to the optimum TES.

The present invention utilizes dual adjustable and fixed TES thresholds to filter noise glitches on smaller off track conditions and simultaneously provide fast detection of large off track excursions.

II. General System Architecture and Operation

Figure 1:
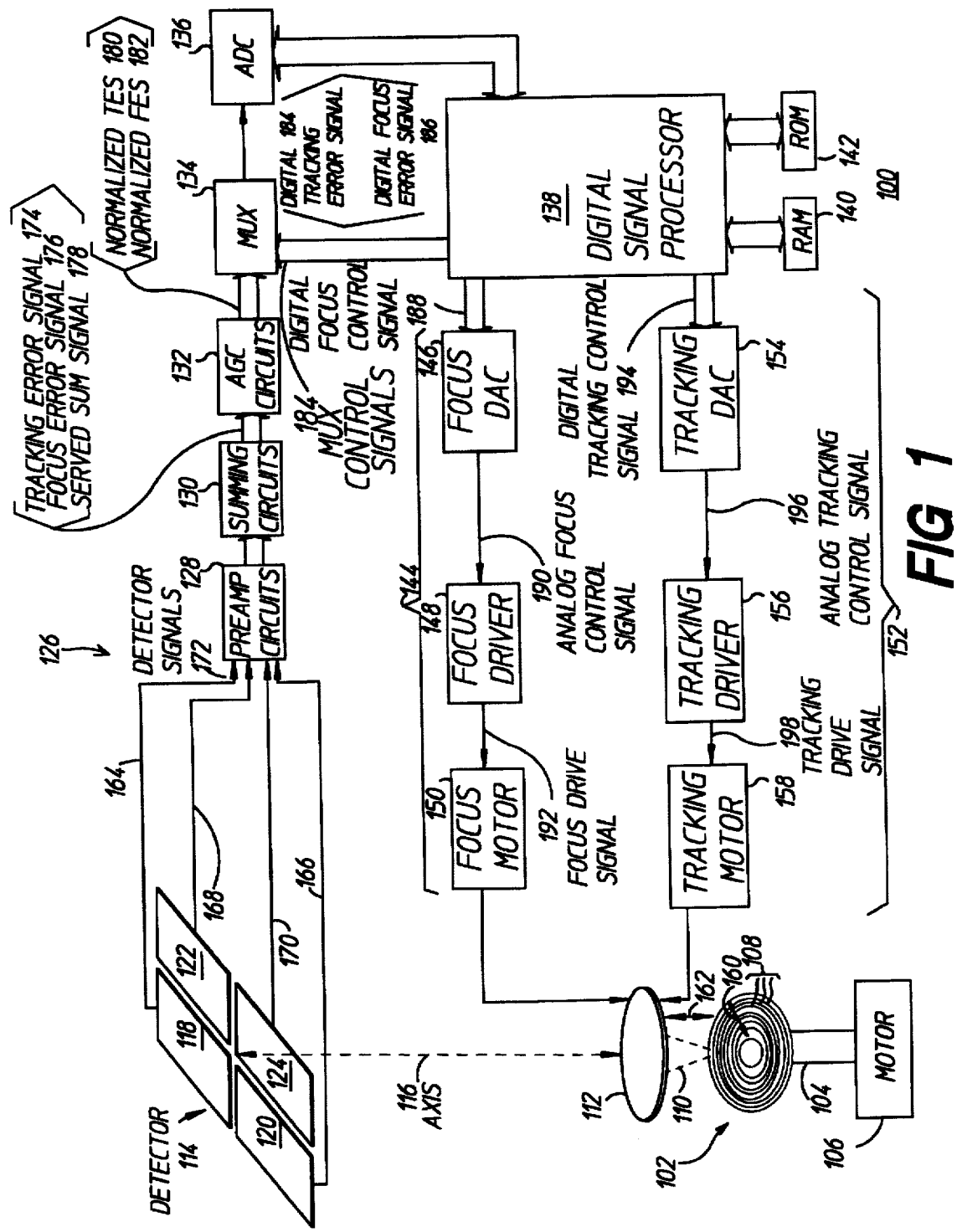
FIG. 1 is a block diagram representation of an optical disk drive in which the off-track detection method of the present invention is implemented.

FIG. 1 illustrates an optical disk drive system 100 in which the off-track detection system and method of the present invention are implemented. Referring to FIG. 1, optical disk drive 100 operates on a grooved optical disk 102, which is mounted on a spindle 104 and rotated by a motor 106. Digital information is written, read, and erased at individual bit positions (not shown) on servo tracks 108 of disk 102 using a laser beam 110. Laser beam 110 is generated by a laser source (not shown) and focused on optical disk 102 by an objective lens 112.

When writing or erasing data on servo tracks 108, laser beam 110 is switched to a high, or write intensity level. While high intensity laser beam 108 is applied to servo tracks 108, a magnetic bias field having an appropriate write or erase polarity, respectively, is applied to the bit position. Digital information is thereby generated and stored as a function of the induced magnetic orientation of the bit positions.

Laser beam 110 is switched to a low or read intensity level when information is being read from bit positions on Optical disk 102. After being focused onto servo tracks 108, the polarization angle of the read intensity laser beam 110 is modulated as a function of the magnetic orientation of the bit positions. The modulated beam 110 is reflected from disk 102 and directed to a pair of detectors, one of which is shown as detector 114. The other detector of the detector pair is similar to detector 114 and is omitted for clarity. The detector pair, comprising detector 114 and an omitted detector, are collectively and generally referred to as detector 114. The modulated beam 110 is directed to detector 114 using a prism beam splitting device (not shown) so that the axis 116 of the focus beam is aligned at the center point of detector 114 as shown in FIG. 1. In a preferred embodiment of the present invention, detector 114 includes four separate sections, or elements 118, 120, 122, and 124. However, as one of ordinary skill in the relevant art would find apparent, other arrangements of detector 114 may be implemented with the present invention.

Optical drive 100 also includes tracking and focus servo systems for accurately positioning objective lens 112 with respect to bit positions of disk servo tracks 108 at which information is to be written, read, or erased. Common elements 126 of both the focus and tracking servo systems include objective lens 112, detector 114, preamplifier (preamp) circuits 128, summing circuits 130, automatic gain control (AGC) circuits 132, multiplexer (MUX) 134, analog-to-digital converter (ADC) 136, digital signal processor (DSP) 138, and DSP-associated random access memory (RAM) 140 and read only memory (ROM) 142.

Elements 144 specific to the focus servo system include focus digital-to-analog (DAC) converter 146, focus driver 148, and focus motor 150. Elements 152 specific to the tracking servo system are tracking digital-to-analog converter (DAC) 154, tracking driver 156, and tracking motor 158. Thus, the focus servo system includes common elements 126 and specific elements 144. Likewise, the tracking servo system including common elements 126 and specific elements 152.

The tracking servo system 126,152 drives and positions objective lens 112 along a tracking axis 160 so as to center laser beam 110 on a desired servo track 108. The focus servo system 126,144 drives and positions objective lens 112 along a focus axis 162 so as to properly focus laser beam 110 onto optical disk 102. The closed optical and electrical paths through tracking servo system 126,152 and focus servo system 126,144 are characterized as servo loops. The operation of servo loops are considered to be well known to a person skilled in the relevant art.

After laser beam 110 is focused onto disk 102 and modulated by the magnetic orientation of bit positions on servo tracks 108, laser beam 110 is reflected back through lens 112 and directed to the center of detector 114. This causes each detector element 118, 120, 122, and 124 to generate a detector signal. Detector element 118 generates a detector signal transmitted over detector signal line 164. Detector element 120 generates a detector signal transmitted over detector signal line 166. Detector element 122 generates a detector signal transmitted over detector signal line 168. Detector element 124 generates a detector signal transmitted over detector signal line 170. These detector signals are collectively and generally referred to as detector signals 172. Detector signals 172 are individually amplified by preamplification circuits 128 and applied to summing circuits 130. Summing circuits 130 combine detector signals 172 in a predetermined manner (discussed below) to produce a tracking error signal (TES) 174, a focus error signal (FES) 176, and a servo sum signal (SUM) 178. Each of these will be discussed in detail below.

Tracking error signal 174 is produced by summing circuits 130 as function of the difference between sum of the amplitudes of signals from detector sections 118 and 120 and the sum of the amplitudes of signals from detector sections 122 and 124. That is, TES 174=[(118+120)−(122+124)]. Tracking error signal 174 has a generally sinusoidal shape with a polarity and magnitude representative of the direction and distance, respectively, that laser beam 110 is displaced from the center of a desired servo track 108.

Focus error signal 176 is generated as a function of the difference between the sum of the amplitudes of the signals from detector sections 118 and 122, and the sum of the amplitudes of the signal from detector sections 120 and 124. That is, FES 176=[(118+122)−(120+124)]. Focus error signal 176 has a polarity and magnitude representative of the direction and distance, respectively, that objective lens 112 is displaced from its proper focus position.

The servo sum signal 178 is the sum of the amplitudes of the signals from all four detector elements 118, 120, 122, and 124. That is, SUM 178=[118+120+122+124]. Thus the servo sum signal is a measure of the overall intensity (that is, the combined amplitudes of the signals) of laser beam 110 on detector 114.

The analog tracking error signal 174, focus error signal 176, and servo sum signal 178 are each applied to automatic gain control (AGC) circuits 132. AGC circuits 132 normalize tracking error signal 174 and focus error signal 176 by dividing these signals by the servo sum signal 178 as they are received from summing circuits 130. AGC circuits 132 normalize the tracking error signal 174 and the focus error signal 176 to compensate for the variations in media reflectivity. That is, as the reflectivity decreases the resulting signal amplitude of the tracking errors signal 174, focus error signal 176, and servo sum signal 178 also decrease. The normalization process results in values which are not affected by the variations in reflectivity. However, the normalized tracking error signal 180 and the normalized focus error signal 182 still retain their original dimensions. That is, normalized tracking error signal 180 is a voltage representing distance off track indirectly through a sine function (discussed below) and focus error signal 182 is a voltage representing micrometers (μM) out of focus.

The normalized tracking error signal 180 and normalized focus error signal 182 are individually applied to MUX (multiplexer) 134 by AGC circuits 132. MUX 134 is controlled by digital signal processor 138 by way of MUX control signals sent via MUX control signal line 184. MUX 134 routes normalized tracking error signal 180 and normalized focus error signal 182 to analog-to-digital converter (ADC) 136. ADC 136 digitizes the normalized tracking error signal 180, and normalized focus error signal 182 to produce a digital tracking error signal 184 and a digital focus error signal 186 and applies them to digital signal processor 138.

Digital signal processor 138 processes digital tracking error signal 184 and digital focus error signal 186 in a predetermined manner (discussed below) using read only memory (ROM) 142 and random access memory (RAM) 140. The functions of digital signal processor 138 are further described in commonly owned U.S. Pat. No. 4,942,564 to Hofer, et al., herein incorporated by reference in its entirety.

A digital focus control signal 188 is generated by digital signal processor 138 as a function of digital focus error signal 186. The digital focus control signal 188 is applied to focus DAC (digital to analog converter) 146 which then converts digital focus control signal 188 to analog form. Focus DAC 146 then transmits an analog focus control signal 190 to focus driver 148. Focus driver 148 converts the analog focus control signal 190 into a focus drive signal 192 having current characteristics required to drive focus motor 150. In response to focus drive signal 192, focus motor 150 drives objective lens 112 along focus axis 162, and positions lens 112 to cause laser beam 110 to be properly focused onto optical disk 102.

Digital signal processor 138 processes digital tracking error signal 184 to generate a digital tracking control signal 194. The digital tracking control signal 194 is applied to tracking DAC (digital to analog converter) 154 which then converts the digital tracking control signal 194 to analog form. Tracking DAC 154 then transmits an analog tracking control signal 196 to tracking driver 156. Tracking driver 156 converts the analog tracking control signal 196 into a tracking drive signal 198 having current characteristics required to drive tracking motor 158. In response to tracking drive signal 198, tracking motor 158 drives objective lens 112 along tracking axis 160, and to center lens 112 over a desired servo track 108.

When operated in the closed-loop manner described above, tracking servo system 126, 152 and focus servo system 126, 144 accurately position objective lens 112 so that data can be reliably written, read, and erased at bit positions on disk 102. The general operation of tracking and focus servo systems for optical disk drives are generally known to persons skilled in the art, and are described in commonly owned U.S. Pat. No. 4,700,056 to Silvy et al., herein incorporated by reference in its entirety.

Preamp circuits 128, summing circuits 130, AGC circuits 132, MUX 134, ADC 136, DACs 146 and 154, focus driver 148, and tracking driver 156 can be configured from discrete integrated circuits. Signal multiplexing may be accomplished in a variety of ways including time multiplexing. These techniques are known to a person skilled in the relevant art. Focus and tracking motors 150, 158 are also considered to be well known to a person skilled in the relevant art.

III. Off Track Detection

A. Tracking Error

The off-track operation system and method of the preferred embodiment is now described. First, the relationship between the tracking error signal and the position of the laser beam relative to the data tracks is explained. Then, the relationship between the tracking error signal and the focus error signal is discussed. Then, given this relationship, the generation of an adjustable tracking error signal threshold which is related to the focus error signal in the same manner as the tracking error signal is discussed. Alternative embodiments and conditions made for optical head astigmatism is discussed.

FIG. 2 illustrates an example of sinusoidal tracking error signal 174. FIG. 3 illustrates a cross-section of optical disk 102. Taken together, FIGS. 2 and 3 illustrate the relationship between tracking error signal 174 and the position of objective lens 112 on tracking axis 160. Optical disk 102 has an uneven surface made of grooves and land portions. In the optical disks utilized in a preferred embodiment, data is written on the land portion 108 of the optical disk 102. Thus, the land portions are synonymous with the servo tracks 108 discussed above. Alternatively, optical disk drive 100 may be configured to operate with optical disks which store data on grooves 302. In a preferred embodiment of the present invention, servo tracks 108 are actually a single, spirally-positioned track. Alternatively, and as shown in FIG. 1, servo tracks 108 may also be implemented as a plurality of concentrically positioned tracks.

Referring to FIGS. 2 and 3, tracking error signal 174 varies according to the position of laser beam 110 relative to lands 108. As discussed above, objective lens 112 controls the position of focused laser beam 110 on disk 102. When focused beam 110 is positioned at the center of either a land portion 108 or a groove 302, the magnitude of tracking error signal 174 is zero. For example, when laser beam 110 is at the center of one groove 302, tracking error signal 174 is at point 202. When laser beam 110 is at the center of a neighboring groove 302 when tracking error signal 174 is at point 204. The point of zero crossing 206 between these two points indicates that focused laser beam 110 is at the center of a land 108.

When the position of focused laser beam 110 transitions between a groove 302 and land portion 108, the magnitude of tracking error signal 174 increases or decreases sinusoidally to a maximum positive or maximum negative value.

For example, when the position of focused beam 110 transitions from a groove 302 to a land portion 108, as shown at point 304, tracking error signal 174 increases to its maximum positive value. Likewise, when the position of focused beam 110 transitions from a land portion 108 to a groove 302, as shown at point 306, tracking error signal 174 decreases to its maximum negative value. Note therefore, that tracking error signal 174 does not indicate which specific servo track 108 laser beam 110 is aligned with. Rather, tracking error signal 174 indicates the physical position of focused laser beam 110 relative to lands 108 and grooves 302. More specifically, tracking error signal 174 represents the relationship between the distance from the center of a land 108 (distance off track) as a portion of total track pitch. The relationship between tracking error signal 174 and distance off track is represented by equation (1).

$$TES = \sin\left(\frac{\text{distance off track}}{\text{track pitch}} \times 360°\right) \quad (1)$$

where,

TES=tracking error signal 174 distance off track=physical distance from center land (µM)

track pitch=track pitch of optical disk 102 (µM)

Percent off track is the distance off track expressed as a percent of track pitch. This relationship is shown below in equation (2).

$$\% \text{ off track} = \frac{\text{distance off track}}{\text{track pitch}} \times 100 \quad (2)$$

where,

% off track=percent off track distance off track=physical distance from center land (µM)

track pitch=track pitch of optical disk 102 (µM)

Solving equation (1) for distance off track yields expression (3).

$$\text{distance off track} = \text{track pitch} \times \frac{\sin^{-1}(TES)}{360°} \quad (3)$$

The above relationship is now discussed with reference to two examples. First, if an optical disk has a track pitch of 1.6 µM, the distance from the center of one land 108 to the center of a neighboring land 108 is 1.6 µM. When operating on such an optical disk, the maximum normalized tracking error signal 180 (TES=1) occurs when laser beam 110 is 25% off track, or 0.4 µM, as shown below:

$$\text{distance off track} = 1.6 \times \frac{90°}{360°} \quad (4)$$

$$\text{distance of track} = 1.6 \,\mu M * 25\%$$

$$\text{distance off track} = 0.4 \,\mu M$$

In another example, if it is desired to prevent read and erase operations from occurring when focused laser beam 110 is at 20% off track, then the associated value of normalized tracking error signal (TES) 180 which must not be exceeded is determined below. First the actual physical distance corresponding to the given percent off track is determined using equation (2).

$$\text{distance off track}=(0.2)(1.6\,\mu M \text{ track pitch})=0.32\,\mu M \quad (5)$$

Thus, 20% off track corresponds to 0.32 µM when the track pitch is 1.6 µM. Then, the associated tracking error signal 174 is determined using equation (1).

$$TES = \sin\left(\frac{.32}{1.6} \times 360°\right) = 0.951 \quad (6)$$

Thus, for an off track threshold of 20%, the tracking error threshold must be set at a normalized tracking error signal 180 of 0.951.

B. Tracking and Focus Error Signal Relationship

FIG. 4 illustrates multiple periods of a sinusoidally varying normalized tracking error signal 180. FIG. 5 illustrates a normalized focus error signal (FES) 182. Taken together, FIGS. 4 and 5 illustrate the relationship between normalized tracking error signal 180 and normalized focus error signal 182.

As discussed above, conventional optical drive systems utilize a fixed tracking error signal threshold level against which to compare normalized tracking error signal 180 to determine if laser beam 110 is sufficiently off track to warrant correction. For example, referring to FIG. 4, fixed thresholds 402 and 404 are set at levels corresponding to ±15% off track. There are two time periods of normalized tracking error signal 180 illustrated in FIG. 4. During time period 406, normalized tracking error signal 180 has a maximum positive and maximum negative values which exceed the predetermined fixed TES thresholds 402 and 404. Some time later during time period 408, normalized tracking error signal 180 has maximum positive and maximum negative values which are less that the predetermined fixed TES thresholds 402 and 404. This is discussed in further detail below.

Referring to FIG. 5, time range 502 illustrates a typical focus error signal amplitude during which objective lens 112 is optimally focused. When objective lens 112 is optically focused, normalized focus error signal 182 is approximately zero. As objective lens 112 transitions out of focus, the amplitude of normalized focus error signal 182 increases or decreases, depending upon the direction along focus axis 162 objective lens 112 is traveling. Referring to time period 504, the amplitude of normalized focus error signal 182 is increasing, indicating that objective lens 112 is transitioning out of focus. During this period, servo sum signal 178 has not significantly changed in value since the overall incidence of light on detector 114 has not changed.

Referring to FIGS. 4 and 5, the general relationship between the tracking and focus error signals is now discussed. During time period 502 normalized focus error signal 182 is negligible as objective lens 112 is held in focus. If during the same period of time 406, focused laser beam 110 transitions across servo tracks 108, the normalized tracking error signal 180 illustrated in time period 406 of FIG. 4 would be generated. During time period 504, focused laser beam 110 has traveled along focus axis 162 and has transitioned marginally out of focus. The corresponding normalized focus error signal 182 is shown increasing to a value corresponding to the distance out of focus. If during the same period of time 408, focused laser beam 110 transitions across servo tracks 108, the normalized tracking error signal 180 illustrated in time period 408 of FIG. 4 would be generated. Thus, the magnitude of a tracking error signal which is generated when objective lens 112 is optimally focused (FES amplitude approximately zero) is greater than the magnitude of a tracking error signal which is generated when objective lens 112 is out of focus (FES amplitude not zero). This reduced tracking error signal amplitude fails to cross the fixed threshold levels 402 and 404. This, in turn, prevents digital signal processor 138 from detecting an off track condition. As a result, objective lens 112 may improperly direct laser beam 110 to write, read, or erase data in an incorrect servo track 108 during period 408.

An out of focus threshold check is conventionally relied upon to detect this condition but has been found to be insufficient at high external shock levels. Even at small focus offset distances, the tracking error signal fixed threshold check becomes inaccurate, resulting in the system writing partially over adjacent tracks. Thus, as discussed above, conventional optical disk drives utilizing fixed thresholds to determine objective lens track position are ineffective in optical drive systems which experience external forces since these external forces cause the objective lens to momentarily go out of focus.

The dependency of normalized tracking error signal 180 on the degree of focus is now discussed. As objective lens 112 travels out of focus, the ability to resolve features is reduced. As a result, the image projected on detector 114 loses contrast, thereby causing a drop in the amplitude of tracking error signal 174. However, as objective lens 112 travels out of focus, the total amount of light incident upon elements 118, 120, 122, and 124 remains relatively constant. Therefore, there is a limited change in servo sum signal 178 with deviations from optimal focus position. Since, as discussed above, AGC circuits 132 normalize the analog tracking error signal 174 and analog focus error signal 176 by dividing these signals by the value of servo sum signal 178, the normalized values also decrease in amplitude. As a result, although FIG. 4 illustrates normalized tracking error signal .180, this same characteristic signal also represents analog tracking error signal 174. This condition exists until objective lens 112 goes greatly out of focus. At that time, the total amount of light incident upon elements 118, 120, 122, and 124 is decreased, thereby reducing the value of servo sum signal 178.

The reason why AGC circuits 132 does not initially amplify tracking error signal 174 is because it utilizes sum servo signal 178 to determine the amount of gain. This is because changes in tracking error signal amplitude associated with the initial losses of focus may be attributed to objective lens 112 traveling along tracking axis 160. Thus, AGC 132 does not initially compensate for the above decrease in tracking error signal 174 amplitude since there is no corresponding loss of servo sum signal 178 amplitude. Greater losses of focus, however, are reflected in servo sum signal 178, and therefore cause AGC 132 to amplify tracking error signal 174 and focus error signal 176.

C. Adjustable Tracking Error Signal Threshold

Figure 6:
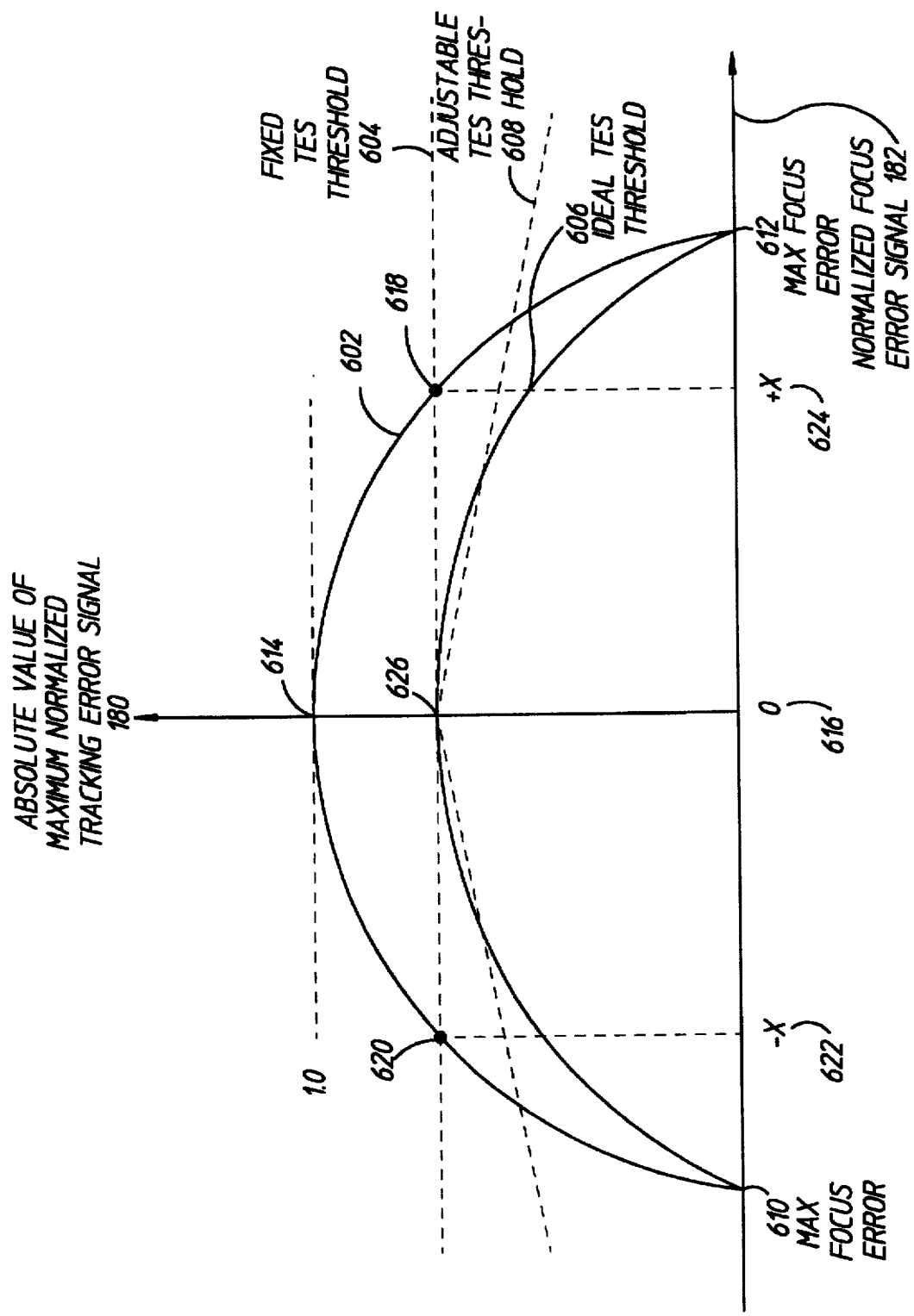
FIG. 6 is a graph showing the relationship between the maximum normalized tracking error signal and the normalized focus error signal.

FIG. 6 illustrates the relationship between the tracking and focus error signals independent of time. Referring to FIG. 6, the Y-coordinate represents the absolute value of the maximum amplitude of normalized tracking error signal 180. The X-coordinate represents the normalized focus error signal 182 in μM. The maximum amplitude of normalized tracking error signal 180 is the peak value of the normalized tracking error signal 180, as shown in FIG. 4. As discussed above, normalized focus error signal 182 and normalized tracking error signal 180, result from dividing focus error signal 176 and tracking error signal 174, respectively, by the servo sum signal 178 to compensate for the variations in media reflectivity.

The relationship between the maximum values of normalized tracking error signal 180 and normalized focus error signal 182 is represented by maximum normalized tracking error signal vs normalized focus error signal curve (max TES vs FES) 602. Since the tracking error is maximum when focused laser beam 110 is at quarter-track (25% track pitch), max TES vs FES 602 represents the impact of the position of objective lens 112 along focus axis 162 on the response of tracking error signal 174 when laser beam 110 is at 25% off track. The maximum value 614 of normalized tracking error signal 180 occurs when normalized focus error signal 182 is optimally focused. This position is referred to as the zero focus error point 616. Thus, as normalized focus error signal 182 deviates from zero focus error point 616, the amplitude of maximum tracking error signal 180 decreases in value from maximum value 614.

The point at which objective lens 112 is optimally focused varies among optical disk drives as well as among optical disks. Thus, in optical disk drive 100 of the present invention, digital signal processor 138 determines this optimal point each time an optical disk 102 is loaded into drive 100. That is, digital signal processor 138 determines zero focus error point 616 by adjusting objective lens 112 along focus axis 162 to obtain maximum value 614. When objective lens 112 is completely out of focus, as shown by maximum focus error points 610 and 612, the maximum possible normalized tracking error signal 180 is zero. In a preferred embodiment of the present invention, the normalized focus error signal 182 ranges from 1 to 2 μM at points 610 and 612.

Fixed TES threshold 604 is a constant value tracking error threshold representing a maximum tracking error signal 180 value which corresponds to a specific percent off track. Fixed TES threshold 604 is equivalent to fixed TES thresholds 402 and 404 illustrated in FIG. 4. Referring to FIG. 6, as the focus error deviates from zero, the percentage of maximum normalized tracking error signal 180 represented by fixed TES threshold 604 varies. At zero focus error point 616, fixed TES threshold 604 represents a value 626 of maximum tracking error signal 180. For example, if fixed TES threshold 604 is set such that normalized tracking error signal 180 crosses the threshold at a signal amplitude 626 of 0.6, then fixed TES threshold 604 represents 11% off track (0.18 μM), at zero focus error point 616 (see equation (3)). At a focus offset of ±X μM (622, 624), maximum tracking error signal 180 intersects fixed TES threshold 604 (points 618 and 620). In contrast to value 626, at these two points, maximum tracking error signal 180 will not cross fixed TES threshold 604 until focused laser beam 110 is 25% off track (0.4 μM) since max TES vs FES 602 represents the maximum normalized TES signal 180, which always corresponds to 25% off track. In a preferred embodiment of the present invention, normalized focus error signal 182 has a value of ±1 μM at points 624 and 622, respectively.

Thus, fixed TES threshold 604 is used by digital signal processor 138 to detect off track conditions at increasingly greater off track percentages as the focus error increases. As normalized focus error signal 182 exceeds 622, 624, the amplitude of maximum tracking error signal 180 does not even exceed fixed TES threshold 604 and therefore would go undetected. Thus, as normalized focus error signal 182 increases in a positive or negative direction from zero focus error point 616, the ability of fixed TES threshold 604 to detect a specified percent off track continually degrades until it is rendered ineffective.

An ideal TES threshold 606 of the present invention is illustrated in FIG. 6. Ideal TES threshold 606 is determined such that it represents the same percentage of maximum normalized TES 180 regardless of the position of objective lens 112 along focus axis 162. Thus if the desired percent off track was 11%, ideal TES threshold 606 would represent 11% off track from zero focus error point 616 to maximum focus error points 610, 612.

In a preferred embodiment of the present invention, ideal TES threshold 606 is represented by adjustable TES threshold 608. Adjustable TES threshold 608 is a straight line approximation of ideal threshold TES 606. Adjustable TES threshold 608 is calculated to most closely approximate ideal threshold TES 606 in the operational range of objective lens 112. In a preferred embodiment of the present invention, the operational range of normalized focus error signal 182 is ±0.5 μM. Thus, adjustable TES threshold 608 is chosen to yield a close approximation of ideal TES threshold 606 within ±0.5 μM of zero focus error point 616. However, as one of ordinary skill in the art would find apparent, ideal TES threshold 606 provides improved off track detection well beyond this operational range.

Figure 7:
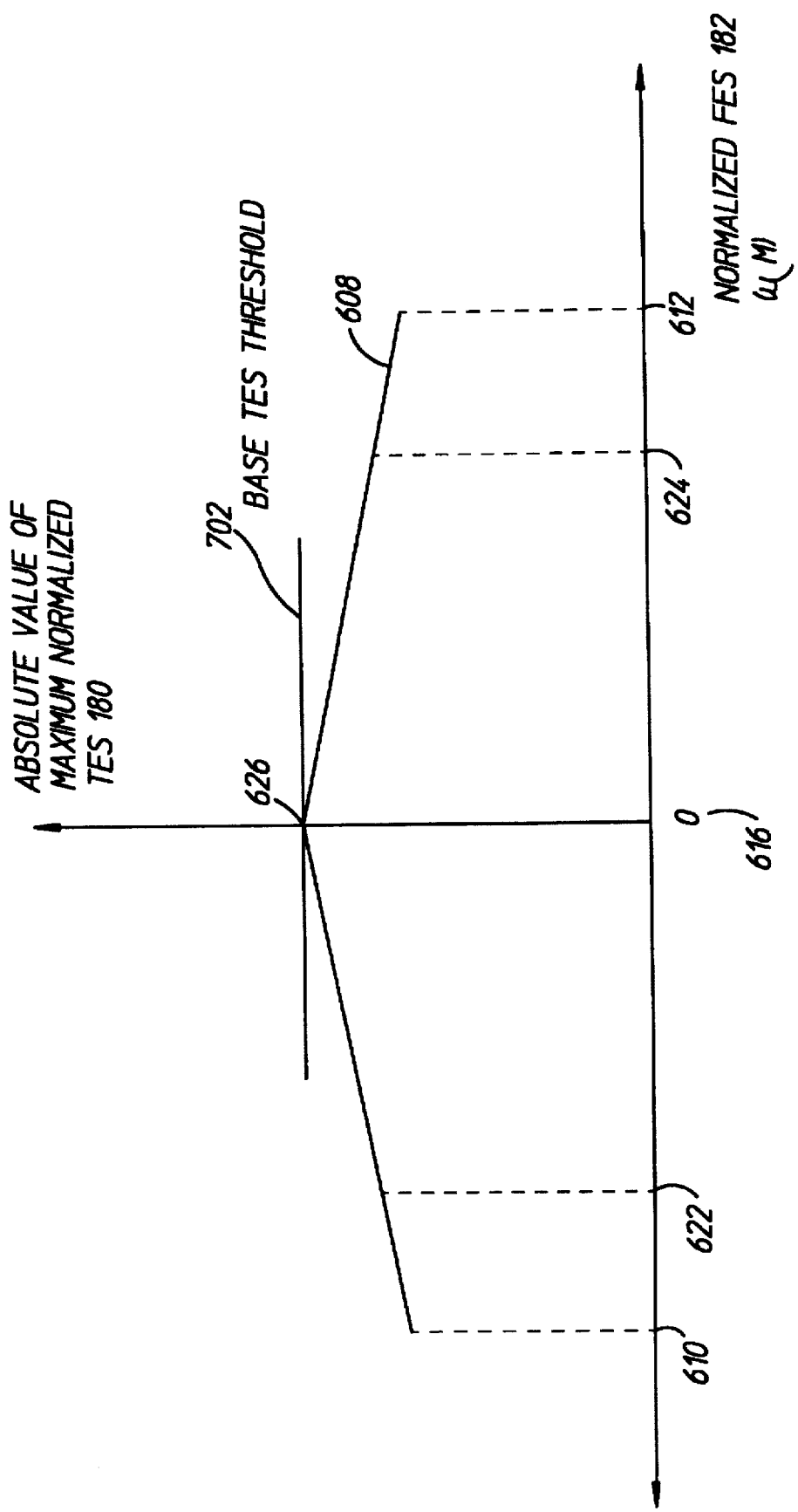
FIG. 7 is a graph of an adjustable tracking error signal threshold.

FIG. 7 is a graph of adjusted TES threshold 608. Similar to FIG. 6, the Y-coordinate represents the absolute value of the maximum amplitude of normalized tracking error signal 180 and the X-coordinate represents the normalized focus error signal 182 in μM. For purposes of clarity, max TES vs FES 602 and ideal TES threshold 606 have been omitted. Referring to FIG. 7, adjustable TES threshold 608 is continuously calculated based on the amount of focus error. Adjustable TES threshold 608 is a single straight line approximation of ideal TES threshold 606 for positive focus offsets (zero focus offset 616 to maximum positive offset 612). Also, adjustable TES threshold 608 is a single straight line approximation of ideal TES threshold 606 for negative focus offsets (zero focus offset 616 to maximum negative offset 610).

Base TES threshold 702 is the value 626 of the maximum normalized tracking error signal 180 corresponding to the desired percent off track threshold at zero focus error point 616. Base TES threshold 702 is analogous to fixed TES threshold 604 discussed above and illustrated in FIG. 6. The adjustable TES threshold 608 can be calculated by equation (7) below.

$$\text{adjustable TES t-hold} = \text{base TES t-hold} (1 - m_1 \times |\text{FES}|) \quad (7)$$

where,
adjustable TES t-hold=adjustable TES threshold 608
$m_1$=slope of adjustable TES threshold 608
|FES|=absolute value of normalized focus error signal 182
base TES t-hold=base TES threshold 702

The slope of adjustable TES threshold 608 can be any desired value to best approximate ideal TES threshold 606. As discussed above, this has been found to be a sufficient approximation since the optical disk drive 100 of the present invention has a specific focus offset operating range. However, as one skilled in the relevant art Would find apparent, adjustable TES threshold 608 may be comprised of a number of straight line segments, each accurately approximating ideal TES threshold 606 in a given focus offset operational range. The implementation of the above approach is described below.

D. Adjustable Tracking Error Signal Amplification

The present invention includes a second preferred embodiment of the present invention for compensating for the loss of tracking error signal amplitude. Rather than adjusting the off track threshold level based on the amount of focus error that exists, this preferred embodiment amplifies the tracking error signal by an adjustable amount based on the amount of focus error. This adjusted tracking error signal is then compared to a fixed threshold level. This preferred embodiment essentially compensates for the loss of gain due to the focus error and allows the original fixed tracking threshold levels to be used.

Figure 8:
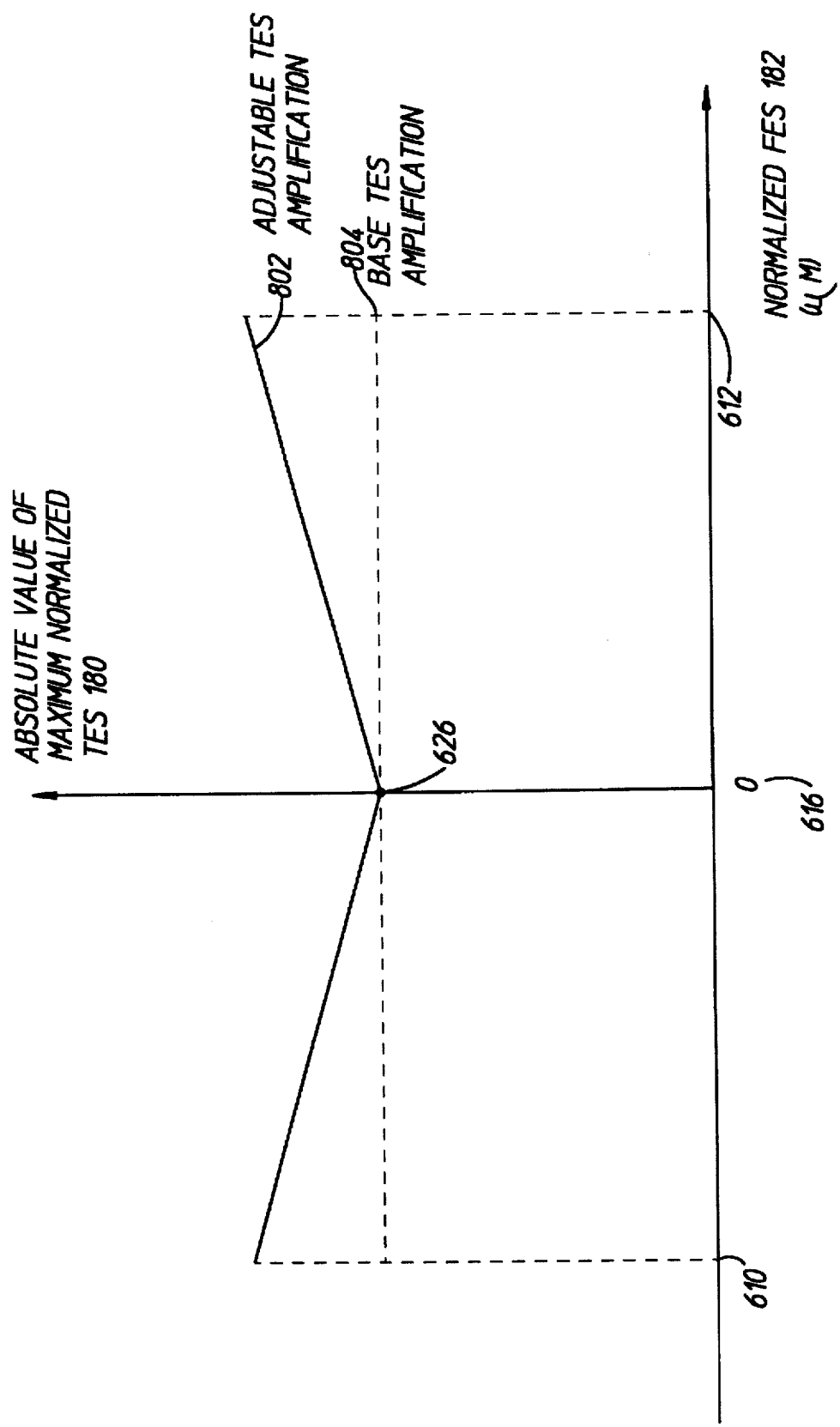
FIG. 8 is a graph of the tracking error signal amplification curve.

Referring to FIG. 8, a TES amplification function 802 is illustrated. The relationship between maximum normalized tracking error signal 180 and normalization focus error signal 182, represented by max TES vs FES 602 continues to apply. That is, as normalized focus error signal 182 deviates from zero focus error point 616, the maximum amplitude of normalized tracking error signal 180 decreases in value from maximum value 614. To compensate for this loss of gain due to focus error, TES amplification function 802 amplifies digital normalized tracking error signal 180 as focus offset values increase. Normalized tracking error signal 180 is then compared against a fixed TES threshold. In a preferred embodiment, TES amplification function 802 is the inverse of adjustable TES threshold 608.

The amplification of normalized tracking error signal 180 by adjustable TES amplification 802 is performed to maintain maximum normalized tracking error signal 180 at a constant value, represented by base TES amplification 804, while the normalized focus error signal increases or decreases. In other words, maximum normalized tracking error signal 180 is held essentially flat, or horizontal, at base TES amplification 804. Ideally, this would be achieved by amplifying normalized tracking error signal 180 by the inverse of max TES vs FES 602, where the inverse and curve 602 are symmetrical about maximum tracking error signal value 626, discussed above. In a preferred embodiment, however, this inverse curve is approximated by adjustable TES amplification 802 for the same reasons given above for approximating ideal TES threshold 606 with adjustable TES threshold 608. The equation for adjustable TES amplification 802 is given below in equation (8).

$$\text{adj TES amplification} = \text{base TES amplification} (1 + m_2 \times |\text{FES}|) \quad (8)$$

where,
adj TES amplification=adjustable TES amplification 802
base TES=amplification base TES amplification 804
$m_2$=slope of adjustable TES amplification 802
|FES|=absolute value of normalized focus error signal 182

The benefit of the embodiment is that less computational steps are required to be performed to determine TES amplification 802, particularly, if multiple TES thresholds are employed (discussed below). The implementation of this approach is described below.

E. Correction For Optical Head Astigmatism

The optimum focal point for generating a maximum tracking error signal 174 is not always the same as the optimum focal point for generating a maximum read signal. In other words, there is astigmatism in the head optics which requires the objective lens 112 to be at one position along focus axis 162 to obtain the maximum read signal and at another point to obtain the maximum tracking error signal 174. The difference in focus offset between these two optimal focus points is referred to as the best read offset (BRO) (discussed below).

To maintain read signal amplitude at the expense of the tracking error signal, digital signal processor 138 calibrates focus servo system 126,144 to generate a reliable read signal by operating at a focus offset that optimizes the read signal levels. The fixed TES threshold is determined as a percentage of the maximum TES amplitude measured at this focal point, rather than the focal point which is optimal for the tracking error signal. To compensate for this difference, digital signal processor 138 must create a corrected adjustable TES threshold.

Figure 9:
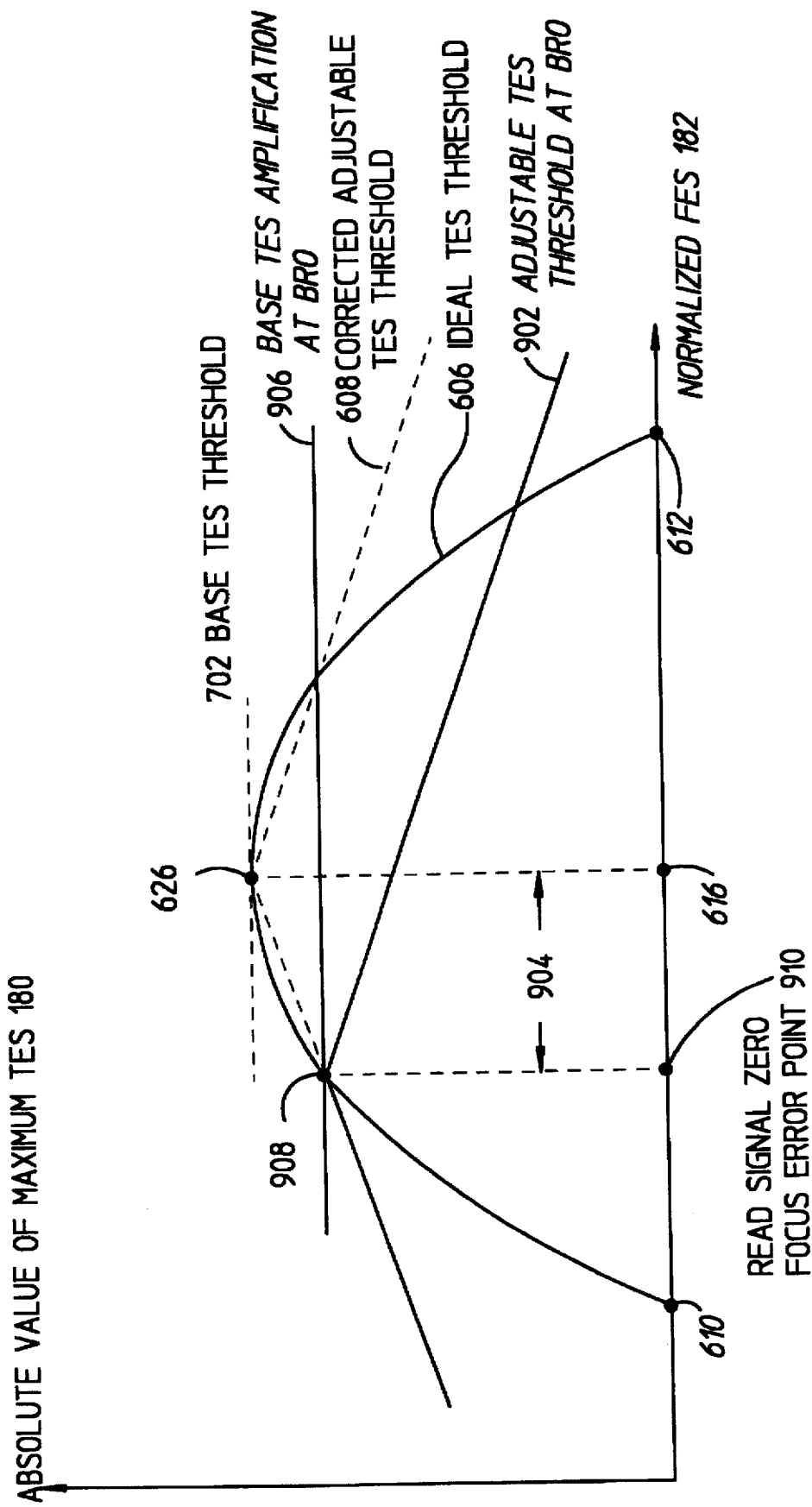
FIG. 9 is a graph of the corrected adjustable tracking error signal threshold in one preferred embodiment of the present invention.

FIG. 9 is a graph of adjustable TES threshold corrected for the optimal read signal focus offset, referred to as corrected adjustable TES threshold 608. Referring to FIG. 9, adjustable TES threshold 902 is the adjustable TES threshold calculated based upon the maximum normalized tracking error signal which is generated at the read signal zero focus error point 910. The corresponding base TES threshold 906 is located at a different point 908 along ideal TES threshold 606.

Even though the actual focus operating point is at read signal zero focus error point 910, the proper adjusted TES threshold should still be centered about the TES zero focus error point 616 as shown by base TES threshold 702. This is because the relationship between the maximum normalized tracking error signal 180 and the normalized focus error signal 182, represented by max TES vs FES curve 602, still exists.

To compensate for best read offset 904, digital signal processor 138 shifts base TES threshold at BRO 906 and adjustable TES threshold at BRO 902 to corrected base TES threshold 702 and corrected adjustable TES threshold 608, respectively. Corrected base TES threshold 702 and corrected adjustable TES threshold 608 correspond to the optimum focal position of objective lens 112 along focus axis 162 for generating tracking error signal 174. That is, they correspond to zero focus error point 616. Thus, corrected base TES threshold 702 and corrected adjustable TES threshold 608 are the same as base TES threshold and adjustable TES threshold in FIG. 6, and are therefore assigned the same reference numbers. Corrected adjustable TES threshold 914 can be calculated by equation (9) below.

$$\text{corr adj TES t-hold} = \text{BRO base TES t-hold}[1 - m_1(\text{lread FES} + \text{BRO} - (\text{BRO}))] \quad (9)$$

where, corr adj TES t-hold=corrected adjustable TES threshold 608

BRO base TES t-hold=base TES threshold at BRO 906

$m_1$=slope of adjustable TES threshold at BRO 902 read FES=normalized focus error signal generated for optimum read signal

BRO=best read offset 904

Figure 10:
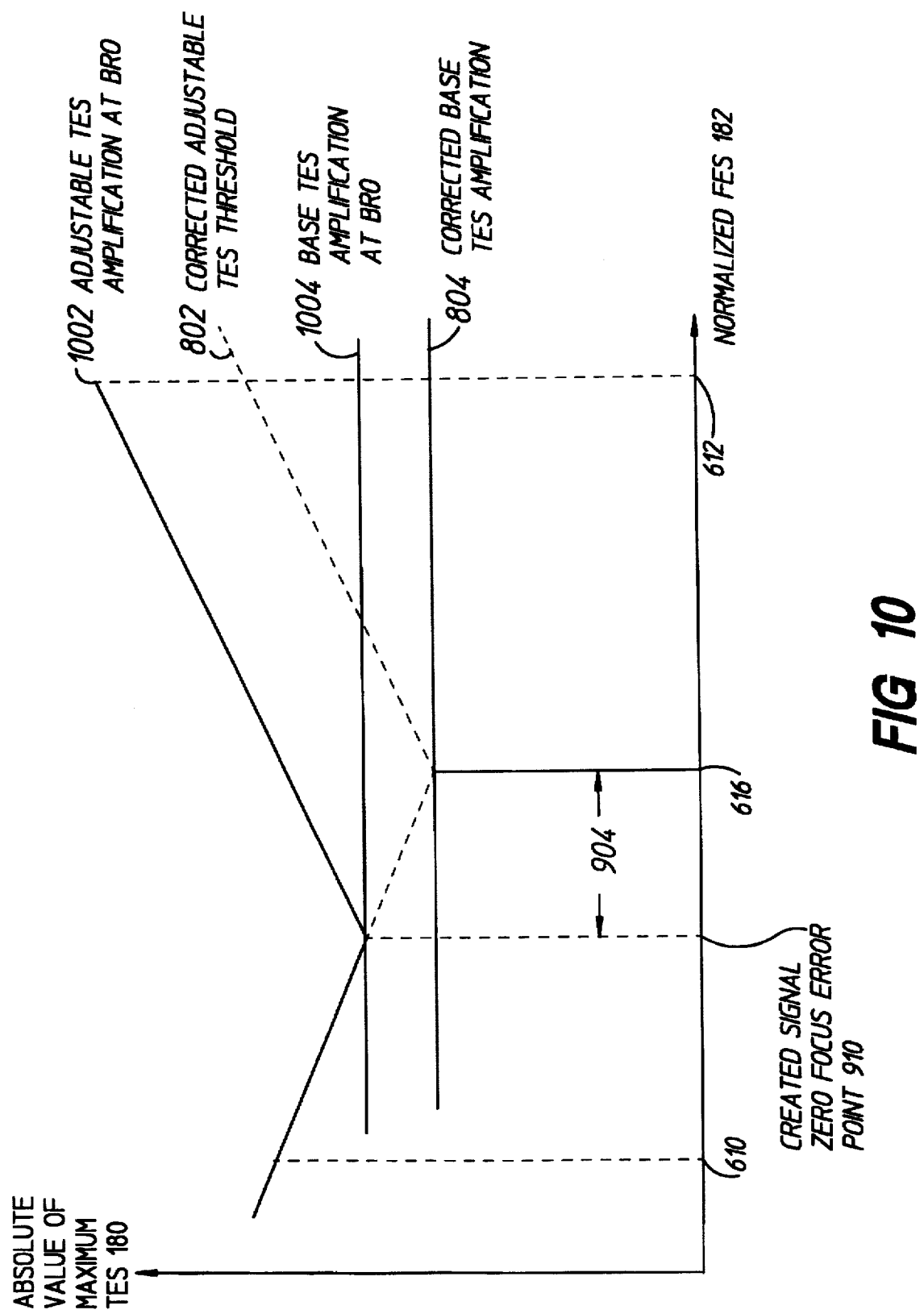
FIG. 10 is a graph of the corrected adjustable tracking error signal amplification curve in one preferred embodiment of the present invention.

FIG. 10 is a graph of adjustable TES amplification corrected for the optimal read signal focus offset, referred to as corrected adjustable TES amplification 802. Referring to FIG. 10, adjustable TES amplification at BRO 1002 is the adjustable TES amplification calculated based upon the maximum normalized tracking error signal 180 generated at the read signal zero focus error point 910.

Even though the actual focus operating point is at read signal zero focus error point 910, the proper adjusted TES threshold should still be centered about the TES zero focus error point 616. This is because the relationship between the maximum normalized tracking error signal 180 and the normalized focus error signal 182, represented by max TES vs FES curve 602, still exists.

To compensate for best read offset 904, digital signal processor 138 shifts base TES amplification at BRO 1004 and adjustable TES amplification at BRO 1002 to corrected base TES amplification 804 and corrected adjustable TES amplification 802, respectively. Corrected base TES amplification 804 and corrected adjustable TES amplification 802 correspond to the optimum focal position of objective lens 112 along focus axis 162 for the tracking error signal. That is, they correspond to zero focus error point 616. Thus, corrected base TES amplification 804 and corrected adjustable TES amplification 802 are the same as base TES threshold and adjustable TES threshold illustrated in FIG. 8, and are therefore assigned the same reference numbers. Corrected adjustable TES amplification 802 can be calculated be equation (10) below.

$$\text{corr adj TES amp} = \text{BRO base TES amp}[1 + m_2(\text{lread FES} + \text{BRO} - (\text{BRO}))] \quad (10)$$

where, corr adj TES amp=corrected adjustable TES amplification 802

BRO base TES amp=base TES amplification at BRO 1006

$m_2$=slope of adjustable TES amplification at BRO 1004 read FES=normalized focus error signal generated for optimum read signal

BRO=best read offset 904

The implementation of corrected adjustable TES amplification 802 is discussed below with reference to FIG. 12.

F. Digital Signal Processor Operations

Figure 11:
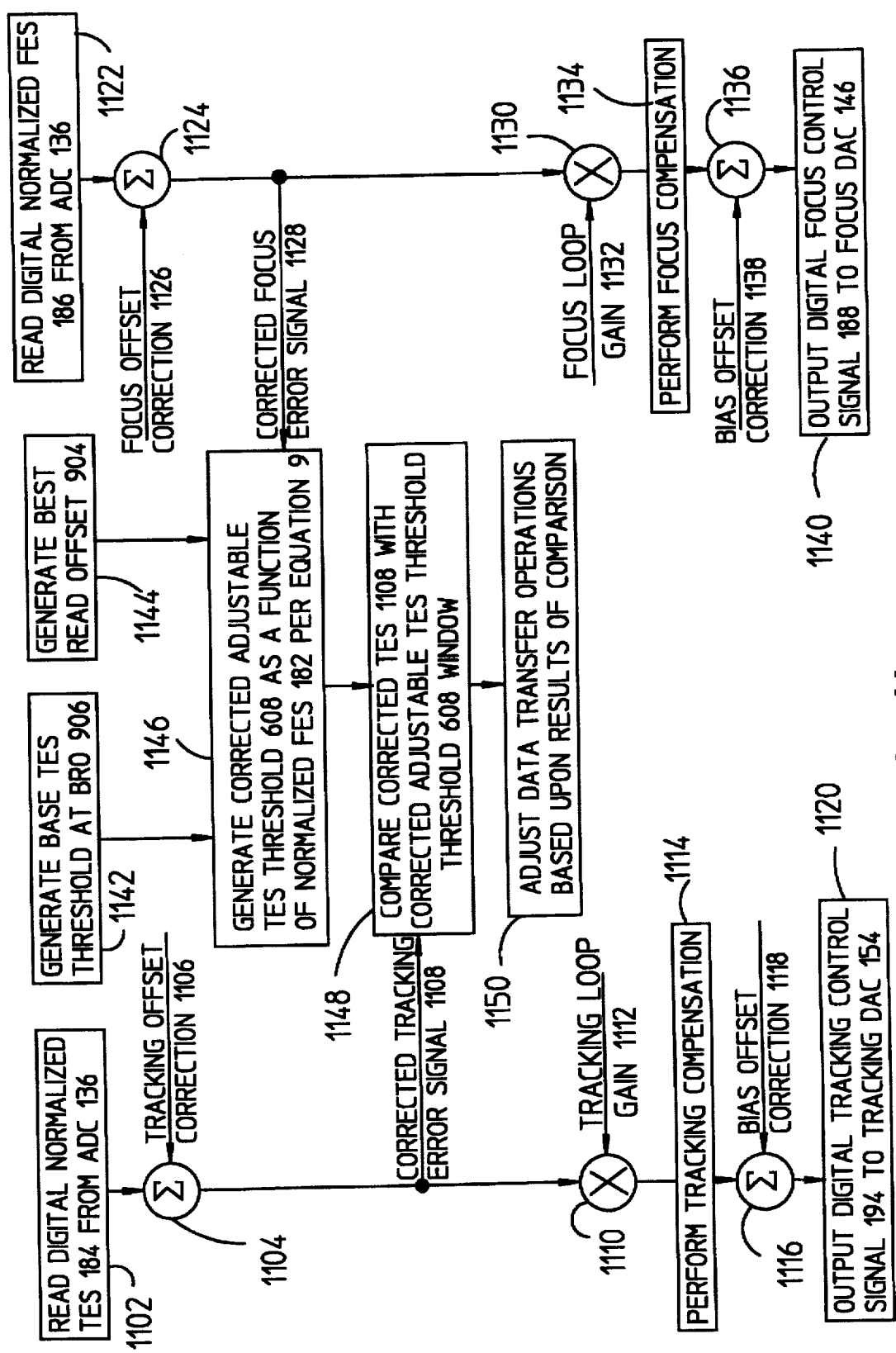
FIG. 11 is a signal flow block diagram implemented to determine the corrected adjustable tracking error signal threshold of the present invention.
Figure 12:
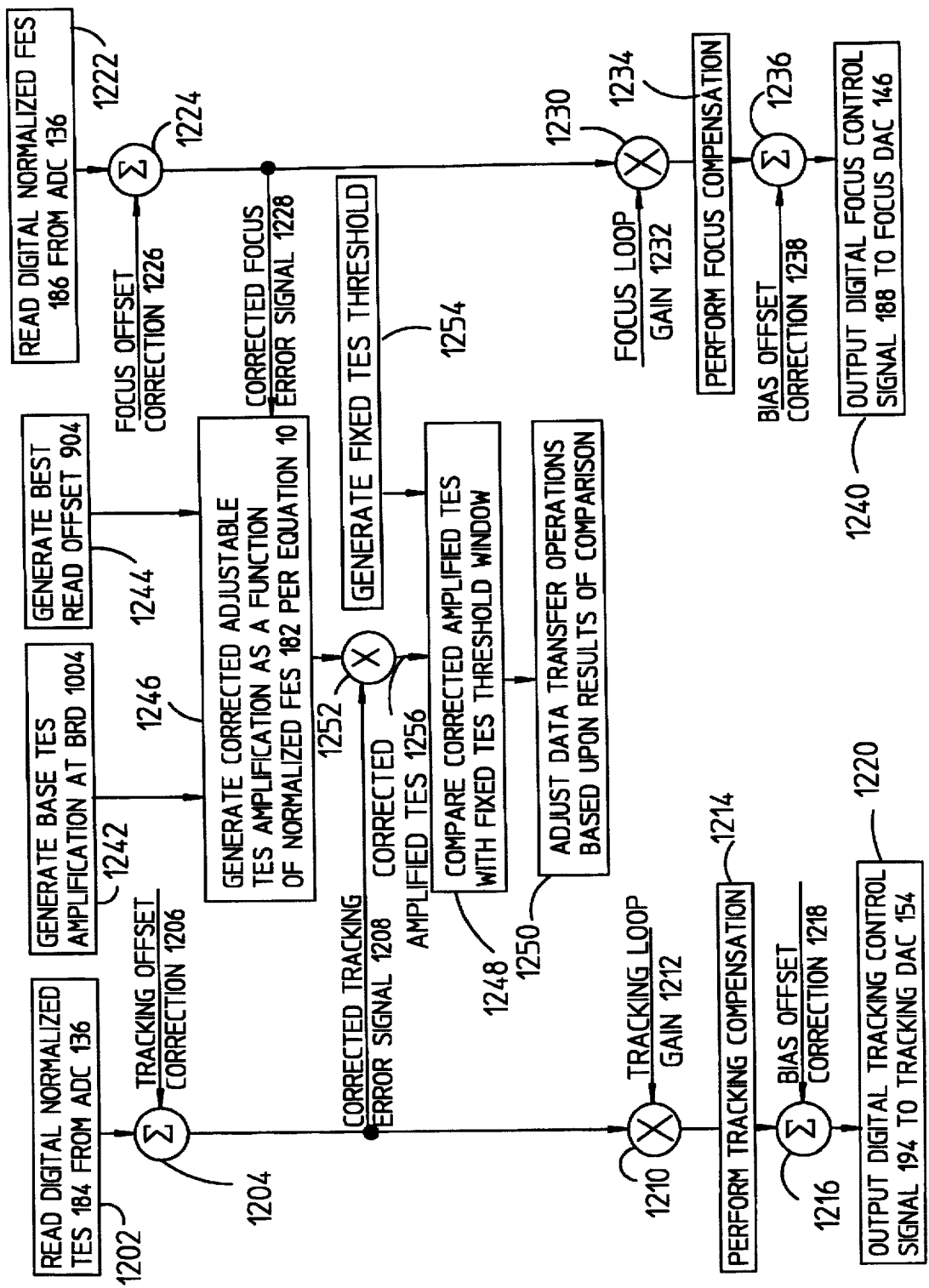
FIG. 12 is a signal flow block diagram implemented to determine the corrected adjustable tracking error signal amplification curve of the present invention.

FIGS. 11 and 12 are signal flow block diagrams illustrating the general operations performed on digital tracking error signal 184 and digital focus error signal 186 by digital signal processor 138. Referring to FIG. 11, the operations performed by digital signal processor 138 to generate corrected adjustable TES threshold 608 is now described. Digital signal processor 138 receives digital normalized tracking error signal 184 from ADC 136 at block 1102. Digital tracking error signal 184 is then summed by the digital signal processor 138 with a tracking offset correction value 1106 at summing junction 1104. The resulting signal is referred to as the corrected tracking error signal 1108. Tracking offset correction 1106 is a calibrated, fixed numeric value which compensates for electrical, mechanical, and other characteristics of tracking servo system 126, 152. Tracking offset correction 1106 is typically selected and stored in RAM 140 during the initial calibration of disk drive 100.

Corrected tracking error signal 1108 is then multiplied by a tracking loop gain 1112 at multiplier 1110 in the digital signal processor 138. This amplification by tracking loop gain 1112 enables digital signal processor 138 to control the bandwidth of the tracking servo system 126, 152. Tracking loop gain 1112 is a numeric value stored in RAM 140. Tracking loop gain 1112 is periodically adjusted to maintain proper gain compensation of tracking servo system 126, 152.

Digital signal processor 138 also filters or frequency compensates the tracking error signal at block 1114 for proper frequency characteristics before it is output as digital tracking control signal 194. This tracking compensation function of block 1114 maintains servo loop stability in tracking servo system 126, 152. In a preferred embodiment of the present invention, digital signal processor 138 utilizes lead-lag and/or lag-lead compensation. However, as one skilled in the relevant art would find apparent, other methods of compensation may be implemented. For example, proportional integral differential (PID) compensation or state variable Compensation may be implemented. In a preferred embodiment of the present invention, tracking error signal 184 is compensated after it has been multiplied by tracking loop gain 1112. However, other sequences of operations would be apparent to one of ordinary skill in the art.

The resulting tracking error signal is then summed at summing junction 1116 with a bias offset correction 1118. Bias offset correction 1118 corrects for the various offsets in the tracking servo system 126, 152, such as amplifier offsets in tracking DAC 154 and actuator offsets in tracking motor 158. Bias offset correction 1118 is a fixed value determined at optical disk start-up. In block 1120, the resulting tracking control signal is output by digital signal processor 138 as digital tracking control signal 194.

Digital signal processor 138 receives digital normalized focus error signal 186 from ADC 136 at block 1122. Digital focus error signal 184 is then summed with a focus offset correction value 1126 at summing junction 1124. The resulting signal is referred to as the corrected focus error signal 1128. Focus offset correction 1126 is a calibrated, fixed numeric value which compensates for electrical, mechanical, and other characteristics of focus servo system 126, 144. Focus offset correction 1126 is typically selected and stored in RAM 140 during the initial calibration of disk drive 100.

Corrected focus error signal 1128 is then multiplied by a focus loop gain 1132 at multiplier 1130. This amplification by focus loop gain 1132 enables digital signal processor 138 to control the bandwidth of the focus servo system 126, 144. Focus loop gain 1132 is a numeric value stored in RAM 140. Focus loop gain 1132 is periodically adjusted to maintain proper gain compensation of focus servo system 126, 144.

Digital signal processor 138 also filters or frequency compensates the focus error signal at block 1134 for proper frequency characteristics before it is output as digital focus control signal 194. This focus compensation function of block 1134 maintains servo loop stability in focus servo system 126, 144. In a preferred embodiment of the present invention, digital signal processor 138 utilizes lead-lag and/or lag-lead compensation. However, as one of ordinary skill in the art would find apparent, other methods of compensation may be implemented. For example, proportional integral differential (PID) compensation or state variable compensation may be implemented. In a preferred embodiment of the present invention, focus error signal 186 is compensated after it has been multiplied by focus loop gain 1132. However, other sequences of operations would be apparent to one of ordinary skill in the art.

The resulting focus error signal is then summed at summing junction 1136 with a bias offset correction 1138. Bias offset correction 1138 corrects for the various offsets in the focus servo system 126, 144, such as amplifier offsets in focus DAC 146 and actuator offsets in focus motor 150: Bias offset correction 1138 is a fixed value determined at optical disk start-up. In block 1140, the resulting focus control signal is output by digital signal processor 138 as digital focus control signal 188.

As discussed above, digital signal processor 138 determines base TES threshold at BRO 906 according to the optimum read signal focus position. This is shown in FIG. 11 at block 1142. Also, digital signal processor 138 generates or determines best read offset 904 when comparing the optimal objective lens focus position for optimum read and tracking error signals. This is shown in FIG. 11 at block 1144.

At block 1146 digital signal process 138 determines corrected adjustable TES threshold 608 as a function of normalized focus error signal 182 according to equation (9). Digital signal process 138 utilizes base TES threshold at BRO 906 and best read offset 904 in this determination. Note that digital normalized focus error signal 186 has been compensated for electrical, mechanical, and other characteristics of tracking servo system 126, 144 prior to being utilized in the determination of corrected adjustable TES threshold 608. That is, digital normalized focus error signal 186 is first summed with focus offset correction 1126 at summing junction 1124 and the resulting corrected focus error signal 1128 is input to block 1146 for use in the determination of corrected adjustable TES threshold 608.

At block 1148, corrected tracking error signal 1108 is compared with corrected adjustable TES threshold 608. As discussed above with reference to FIGS. 4 through 6, the tracking error signal is symmetrical. Thus, corrected adjustable TES threshold 608 has an associated positive and negative value which together form a threshold window.

Digital signal processor 138 determines if optical disk drive 100 will continue write operations based on this comparison in block 1150. The preferred embodiment of this process is discussed below.

The function performed by digital signal processor 138 of the present invention may be implemented in hardware, software, or a combination of both. For example, in the preferred embodiment of the present invention, summing junctions 1104, 1124, 1116, and 1136, and multipliers 1110 and 1130 are performed by digital signal processor 138. However, as one skilled in the relevant art would find apparent, the summation and multiplication functions performed by summing junctions 1104, 1124, 1116, and 1136 and the multiplier functions of multipliers 1110 and 1130 may be performed by hardware units within digital signal processor 138.

Referring to FIG. 12, the general operations performed by digital signal processor 138 to increase the amplitude of digital tracking error signal 184 and compare it to fixed thresholds is illustrated. Digital signal processor 138 receives digital normalized tracking error signal 184 from ADC 136 at block 1202. Digital tracking error signal 184 is then summed with a tracking offset correction value 1206 at summing junction 1204. The resulting signal is referred to as the corrected tracking error signal 1208. Tracking offset correction 1206 is a calibrated, fixed numeric value which compensates for electrical, mechanical, and other characteristics of tracking servo system 126, 152. Tracking offset correction 1206 is typically selected and stored in RAM 140 during the initial calibration of disk drive 100.

Corrected tracking error signal 1208 is then multiplied by a tracking loop gain 1212 at multiplier 1210. This amplification by tracking loop gain 1212 enables digital ,signal processor 138 to control the bandwidth of the tracking servo system 126, 152. Tracking loop gain 1212 is a numeric value stored in RAM 140. Tracking loop gain 1212 is periodically adjusted to maintain proper gain compensation of tracking servo system 126, 152.

Digital signal processor 138 also filters or frequency compensates the tracking error signal at block 1216 for proper frequency characteristics before it is output as digital tracking control signal 194. This tracking compensation function of block 1214 maintains servo loop stability in tracking servo system 126, 152. In a preferred embodiment of the present invention, digital signal processor 138 utilizes lead-lag and/or lag-lead compensation. However, as one skilled in the relevant art would find apparent, other methods of compensation may be implemented. For example, proportional integral differential (PID) compensation or state variable compensation may be implemented. In a preferred embodiment of the present invention, tracking error signal 184 is compensated after it has been multiplied by tracking loop gain 1212. However, other sequences of operations would be apparent to one of ordinary skill in the art.

The resulting tracking error signal is then summed at summing junction 1216 with a bias offset correction 1218. Bias offset correction 1218 corrects for the various offsets in the tracking servo system 126, 152, such as amplifier offsets in tracking DAC 154 and actuator offsets in tracking motor 158. Bias offset correction 1218 is a fixed value determined at optical disk start-up. In block 1220, the resulting tracking error control is output by digital signal processor 138 as digital tracking control signal 194.

Digital signal processor 138 receives digital normalized focus error signal 186 from ADC 136 at block 1222. Digital focus error signal 186 is then summed with a focus offset correction value 1226 at summing junction 1224. The resulting signal is referred to as the corrected focus error signal 1228. Focus offset correction 1226 is a calibrated, fixed numeric value which compensates for electrical, mechanical, and other characteristics of focus servo system 126, 144. Focus offset correction 1226 is typically selected and stored in RAM 140 during the initial calibration of disk drive 100.

Corrected focus error signal 1228 is then multiplied by a focus loop gain 1232 at multiplier 1230. This amplification by focus loop gain 1232 enables digital signal processor 138 to control the bandwidth of the focus servo system 126, 144. Focus loop gain 1232 is a numeric value stored in RAM 140. Focus loop gain 1232 is periodically adjusted to maintain proper gain compensation of focus servo system 126, 144.

Digital signal processor 138 also filters or frequency compensates the focus error signal at block 1236 for proper frequency characteristics before it is output as digital tracking control signal 194. This focus compensation function of block 1234 maintains servo loop stability in focus servo system 126, 144. In a preferred embodiment of the present invention, digital signal processor 138 utilizes lead-lag and/or lag-lead compensation. However, as one skilled in the relevant art would find apparent, other methods of compensation may be implemented. For example, proportional integral differential (PID) compensation or state variable compensation may be implemented. In a preferred embodiment of the present invention, focus error signal 186 is compensated after it has been multiplied by focus loop gain 1232. However, other sequences of operations would be apparent to one of ordinary skill in the art.

The resulting focus error signal is then summed at summing junction 1236 with a bias offset correction 1238. Bias offset correction 1238 corrects for the various offsets in the focus servo system 126, 144, such as amplifier offsets in focus DAC 146 and actuator offsets in focus motor 150. Bias offset correction 1238 is a fixed value determined at optical disk start-up. In block 1240, the resulting focus control signal is output by digital signal processor 138 as digital focus control signal 188.

As discussed above, digital signal processor 138 determines base TES amplification at BRO 1004 according to the optimum read signal focus position. This is shown in FIG. 12 at block 1242. Also, digital signal processor 138 determines best read offset 904 when comparing the optimal objective lens focus position for optimum read and tracking error signals. This is shown in FIG. 12 at block 1244.

At block 1246 digital signal processor 138 determines corrected adjustable TES amplification 802 as a function of normalized focus error signal 182 according to equation (10). Digital signal processor 138 utilizes base TES amplification at BRO 1004 and best read offset 904 in this determination. Note that digital normalized focus error signal 186 has been compensated for electrical, mechanical, and other characteristics of focus servo system 126, 144 prior to being utilized in the determination of corrected adjustable TES amplification 802. That is, digital normalized focus error signal 186 is first summed with focus offset correction 1226 at summing junction 1224 and the resulting corrected focus error signal 1228 is input to block 1246 for use in the determination of corrected adjustable TES amplification 802.

Corrected adjustable TES amplification 802 is then applied to the present corrected tracking error signal 1208. At multiplier 1252 corrected adjustable TES amplification 802 is multiplied by corrected TES 1208 to arrive at corrected amplified TES 1256.

At block 1248, corrected amplified TES 1256 is compared with fixed TES threshold 804 windows generated at block 1254. As discussed above with reference to FIGS. 4 through 6, the tracking error signal is symmetrical. Thus, fixed TES threshold 804 has an associated positive and negative value which together form a threshold window.

Digital signal processor 138 determines if optical disk drive 100 will continue write operations based on this comparison in block 1250. The preferred embodiment of this process is discussed below.

The function performed by digital signal processor 138 of the present invention may be implemented in hardware, software, or a combination of both. For example, in the preferred embodiment of the present invention, summing junctions 1204, 1224, 1216, and 1236, and multipliers 1210 and 1230 are performed by digital signal processor 138. However, as one skilled in the relevant art would find apparent, the summation and multiplication functions performed by summing junctions 1204, 1224, 1216, and 1236 and the multiplier functions of multipliers 1210 and 1230 may be performed by hardware units within digital signal processor 138.

G. Data Transfer Operations Control

Normalized tracking error signal 180 has a noise element which occasionally causes the signal to exceed adjustable TES threshold 608 when objective lens 112 has traveled only a fraction of the corresponding distance along tracking axis 160. This noise causes digital signal process 138 to cease write and erase functions. Soon after, the noise is eliminated and the normalized tracking error signal 180, thereby causing the optical disk drive to resume read and erase functions.

To overcome this problem, a dual adjustable TES threshold is used in the preferred embodiments of the present invention. That is, there is a low adjustable TES threshold and a high adjustable TES threshold. The lower TES threshold level is qualified by longer periods of time than the higher TES threshold level. This has the effect of filtering noise glitches on the smaller off track conditions, but provides fast detection of large off track excursions.

In a preferred embodiment of the present invention, when normalized tracking error signal 180 crosses the low adjustable TES threshold, digital signal processor 138 begins a count of the number of successive low TES threshold crossings. When a specific number of crossings occur during a given period of time, then the crossings are considered legitimate and reading, writing, and erasing of data is ceased. Benever normalized tracking error signal 180 crosses high adjustable TES threshold, digital signal processor 138 immediately ceases reading, writing, and erasing of data.

In the preferred embodiment of the present invention, a magneto-optical (MO) approach is utilized for reading, writing, and erasing data on the optical disk media. However, as one of ordinary skill in the art would find apparent, the present invention may be implemented in optical disk drive systems utilizing other methods to read and write data on optical disks.

Although the invention has been described and illustrated with a certain degree of particularity, it is Understood that those of ordinary skill in the relevant art will recognize a variety of additional applications and appropriate modifications within the spirit of the invention and the scope of the claims.

What is claimed is:

1. In an optical detector positioned to detect a laser beam reflected from the optical disk and configured to generate a plurality of detector signals related to the radial distribution of energy of the laser beam after reflection, a tracking servo system configured to drive and position an objective lens about a tracking axis so as to center said laser beam on a desired servo track, a focus servo system configured to drive and position said objective lens about a focus axis to attain a zero focus error point wherein said laser beam is optimally focused onto the optical disk at said zero focus error point and summing circuitry for generating a tracking error signal and a focus error signal, a method for controlling tracking of the laser beam relative to a track in the optical disk having servo tracks at which data is written to and read from, comprising the steps of:

(1) normalizing said tracking error signal and said focus error signal to obtain a normalized tracking error signal and a normalized focus error signal to compensate for variations in media reflectivity;

(2) converting said normalized tracking error signal and said normalized focus error signal into a digital tracking error signal and a digital focus error signal;

(3) summing said digital tracking error signal with a tracking offset correction value to generate a corrected tracking error signal wherein said tracking offset correction value compensates for electrical and mechanical characteristics of said tracking servo system;

(4) summing said digital focus error signal with a focus offset correction value to obtain a corrected focus error signal wherein said focus offset correction value compensates for electrical and mechanical characteristics of said focus servo system; and (5) compensating for loss in the gain of said tracking error signal as a result of said objective lens traveling out of focus, thereby causing a loss of image contrast, and for head optics astigmatism by using said normalized focus error signal and a best read offset wherein said best read offset represents the difference between an optimum focal point for generating a maximum tracking error signal and an optimum focal point for generating a maximum read signal.

2. The method of claim 1, wherein said compensation step comprises the steps of:

(1) determining a base tracking threshold at said best read offset;

(2) generating a corrected adjustable tracking error signal threshold as a function of said base tracking threshold at said best read offset and said normalized focus error signal; and (3) comparing said corrected tracking error signal with said corrected adjustable tracking error signal threshold to determine if write operations will continue.

3. The method of claim 1, wherein said compensation step comprises the steps of:

(1) determining a base tracking error signal amplification at said best read offset;

(2) generating a corrected adjustable tracking error signal amplification as a function of said base tracking error signal amplification at said best read offset and said normalized focus error signal;

(3) multiplying said corrected adjustable tracking error signal amplification by said corrected tracking error signal to result in a corrected amplified tracking error signal;

(4) determining a fixed tracking error threshold;

(5) comparing said corrected amplified tracking error signal with said fixed tracking error threshold; and (6) determining whether to continue write operations based on said comparison step.

4. The method of claim 1, further comprising the steps of:

(6) multiplying said corrected tracking error signal by a tracking loop gain to control the bandwidth of said tracking servo system;

(7) frequency compensating an output signal from step (6) to attain proper frequency characteristics to maintain servo loop stability in said tracking servo system; and (8) summing an output signal from step (7) with a bias offset correction signal to correct offsets in said tracking servo system, the summation resulting in a digital tracking control signal.

5. The method of claim 4, wherein said tracking loop gain is periodically adjusted to maintain proper gain compensation of said tracking servo system.

6. The method of claim 5, further comprising the steps of:

(9) multiplying said corrected focus error signal by a focus loop gain to control the bandwidth of said focus servo system;

(10) frequency compensating an output signal from step (9) to maintain proper gain compensation of said focus servo system to maintain servo loop stability of said focus servo system; and

(11) summing an output signal from step (10) with a bias offset correction signal to correct offsets in said focus servo system, the summation resulting in a digital focus control signal.

7. The method of claim 6, wherein said focus loop gain is periodically adjusted to maintain proper gain compensation of said focus servo system.

* * * * *